United States Patent
Yamanaka et al.

(10) Patent No.: US 7,859,423 B2
(45) Date of Patent: Dec. 28, 2010

(54) FILM-TYPE ELECTROSTATIC CAPACITANCE SENSOR FOR DETECTING SEAT OCCUPANCY

(75) Inventors: Shoichi Yamanaka, Anjo (JP); Tsutomu Kamizono, Nagoya (JP)

(73) Assignee: Denso Corporation, Kariya (JP)

( * ) Notice: Subject to any disclaimer, the term of this patent is extended or adjusted under 35 U.S.C. 154(b) by 336 days.

(21) Appl. No.: 12/011,187

(22) Filed: Jan. 24, 2008

(65) Prior Publication Data
US 2008/0180234 A1 Jul. 31, 2008

(30) Foreign Application Priority Data
Jan. 25, 2007 (JP) ............... 2007-015428

(51) Int. Cl.
*G08B 13/26* (2006.01)

(52) U.S. Cl. .............. 340/667; 340/438; 180/273; 297/217.6

(58) Field of Classification Search ......... 340/500, 340/540, 665, 666, 667, 425.5, 438; 180/271–273; 297/217.1, 217.3
See application file for complete search history.

(56) References Cited

U.S. PATENT DOCUMENTS

| | | | | |
|---|---|---|---|---|
| 6,424,268 B1 * | 7/2002 | Isonaga et al. | .............. | 340/667 |
| 7,688,204 B2 * | 3/2010 | Yamanaka et al. | .......... | 340/562 |
| 2002/0000742 A1 * | 1/2002 | Wato et al. | ............... | 297/216.1 |
| 2003/0151240 A1 * | 8/2003 | Saitou et al. | ............... | 280/735 |
| 2004/0111201 A1 * | 6/2004 | Thompson et al. | ........... | 701/45 |
| 2004/0194546 A1 * | 10/2004 | Kanehori | ................. | 73/335.04 |
| 2006/0005630 A1 * | 1/2006 | Jitsui et al. | .................... | 73/779 |
| 2006/0164254 A1 * | 7/2006 | Kamizono et al. | .......... | 340/667 |
| 2007/0022819 A1 * | 2/2007 | Takeuchi et al. | .............. | 73/756 |

FOREIGN PATENT DOCUMENTS

| JP | 2001-201129 | | 7/2001 |
|---|---|---|---|
| JP | 2007-101489 | | 4/2007 |
| JP | 2007101489 A | * | 4/2007 |

\* cited by examiner

*Primary Examiner*—Brian A Zimmerman
*Assistant Examiner*—An T Nguyen
(74) *Attorney, Agent, or Firm*—Harness, Dickey & Pierce, PLC

(57) ABSTRACT

A film-type electrostatic capacitance sensor is provided for detecting seat occupancy and for reducing discomfort to a seat occupant and which is easy to produce. The mat of the film-type electrostatic capacitance sensor can be located in a seat portion of a vehicle seat and can include electrodes formed on both sides of a resin film and of a resin coating layer covering the electrodes. The coating layer can be a flexible resin to decrease discomfort for an occupant.

4 Claims, 5 Drawing Sheets

FILM-TYPE ELECTROSTATIC CAPACITANCE SENSOR FOR DETECTING SEAT OCCUPANCY

CROSS REFERENCE TO RELATED APPLICATIONS

The present invention is based on and claims priority to unpublished Japanese Patent Application No. JP 2007-15428 the entire contents of which are incorporated herein by reference.

BACKGROUND OF THE INVENTION

1. Field of the Invention

The present invention relates to a film-type electrostatic capacitance sensor for detecting seat occupancy, and more specifically to a film-type electrostatic capacitance sensor for reducing discomfort to an occupant.

2. Description of Related Art

As shown in FIG. 8 of the drawings, a 2-electrode film-type electrostatic capacitance sensor has been proposed which electrostatically detects whether a seat is occupied through two electrode layers 110 and 120 provided on both sides of a resin film 100 embedded in the seat. In the 2-electrode film-type electrostatic capacitance sensor, cover films 150 and 160 are bonded to the electrode layers 110 and 120 provided on both sides of the resin film 100 via adhesive layers 130 and 140 to cover and protect the electrode layers 110 and 120.

For the 2-electrode film-type electrostatic capacitance sensor, various configurations can be considered. For example, in JP-2001-201129 A, a film-type electrostatic capacitance sensor is proposed that applies an alternating voltage between one electrode layer and a vehicle body, supplies an alternating current to the other electrode layer to adjust the potential at the other electrode layer to a value equal to that of the potential at the one electrode layer, and determines whether a seat is occupied based on a change in the alternating current.

However, some difficulties arise with the above noted sensor configurations. For example, in accordance with the film-type electrostatic capacitance sensor described in JP-2001-201129 A, a seat equipped with the described sensor feels more uncomfortable to a vehicle passenger than a seat without such a sensor. The discomfort is due to the configuration and consistency of the detecting portion of the film-type electrostatic capacitance sensor for detecting seat occupancy. The typical sensor can include a resin film laminate structure as described above, having a characteristic that a resistance to deformation thereof along the shape of, for example, the lower or lumbar region of the human back is accordingly high, resulting in discomfort when pressure from a vehicle passenger's body is applied thereto.

In addition, further difficulties arise in that, with regard to the conventional film-type electrostatic capacitance sensor, since the two electrodes are located at different positions in the thickness direction of the resin film, the action of connecting each of the electrodes to an IC terminal composing a circuit portion becomes difficult.

SUMMARY OF THE INVENTION

The present invention has been achieved in view of the foregoing disadvantages and therefore one object of the present invention is to provide a film-type electrostatic capacitance sensor for detecting seat occupancy that alleviates discomfort to a seat occupant.

Each of the various inventive aspects of the present invention can be applied to a film-type electrostatic capacitance sensor for detecting seat occupancy. The sensor includes a planar mat electrode provided in buried relation in a seat face portion or back rest portion of a seat mounted on a vehicle to extend along the seat face portion or back rest portion. The mat electrode has a resin film extending along the seat face portion or back rest portion, at least two electrodes provided individually on different sides of the resin film, and an electrically insulating electrode protecting portion covering at least an exposed portion of each of the electrodes. A detector circuit portion is provided for detecting a change in an electrical state of the mat electrode based on whether the seat is occupied. For the resin film, a polyethylene terephthalate resin or a polyester resin can be used. For the electrodes, silver or carbon can be used.

In the first aspect of the present invention, the two electrodes are provided individually on substantially both sides of the resin film and the electrode protecting portion provided on at least one of the sides of the resin film can include a resin coating layer.

Thus, the present invention is characterized in that the resin coating layer is used in place of the cover films composed of protective resin films covering the electrodes. The resin coating layer is formed by providing the planar electrodes on the surfaces of the resin film and then coating a resin solution containing a resin dissolved in a solvent on the surfaces of the resin film, and then drying the coated resin solution. As the resin solution used to form the resin coating layer, a resin solution is selected which forms the resin coating layer having a smaller tensile strength in the planar direction than those of the resin film and the cover films. However, it is also possible to use a commercially available paint or the like for the resin coating layer. As a method for resin coating, various known coating methods can be adopted besides the common doctor blade method for applying and spreading inks, paints or other liquefied resinous materials. The tensile strength in the planar direction of the resin coating layer produced by such a method is considerably smaller than those of the cover films produced by a film-forming process. In other words, the resin coating layer resulting from film forming is rather rich in flexibility. As a result, it has been found that, compared with the conventional mat electrode produced by bonding the preformed cover films to the both surfaces of the resin coating layers provided with the electrode layers, the mat electrode according to the present invention allows a substantial reduction in discomfort due to hardness of the sensor. It will be easily understood that the mat electrode is not only applicable to the seat face portion but also to the head rest portion of the seat.

In accordance with one embodiment, the electrode protecting portions provided individually on both of the sides of the resin film are preferably each composed of the resin coating layer. Since the resin coating layer replaces the two cover films each made of a preformed resin film, which are used in the conventional mat electrode, the effect of alleviating discomfort mentioned above can be increased.

Further in accordance with an embodiment, the electrode protecting portion provided on the other sides of the resin film includes a cover film, preferably a resin film, to cover the electrode allowing at least one of the cover films to be replaced by the resin coating layer. As a result, it is possible to implement both a reduction in discomfort and the protecting effect achieved by the cover film.

Still further in accordance with an embodiment, the mat electrode is interposed between a cushion pad of the seat and a surface portion of the seat and the resin coating layer is preferably disposed closer to the cushion pad. In the described arrangement, even when the surface portion of the seat becomes wet, the presence of the cover film allows an improvement in the waterproof protection of the mat electrode.

Still further in accordance with an embodiment, the mat electrode is interposed between a heater portion of the seat and the surface portion of the seat and the resin coating layer is preferably disposed closer to the heater portion. In the described arrangement, even when the surface portion of the seat becomes wet, the presence of the cover film allows an improvement in the waterproof protection of the mat electrode and the heater.

Still further in accordance with an embodiment, the resin coating layer is preferably formed on the same surface of the resin film as the detector circuit portion mounted on the resin film. In the arrangement, the detector circuit portion can also be covered simultaneously with the resin coating layer. As a result, it is possible to improve the function of protecting the detector circuit portion, while avoiding an increase in the number of process steps.

In accordance with a second aspect of the present invention, the two electrodes are provided individually on respective surfaces of the two resin films that are disposed in stacked relation, one of the two electrodes is disposed between the two resin films, and the electrode protecting portion covering the other of the two electrodes can include a resin coating layer.

Thus, in accordance with the second exemplary embodiment, the resin film on the opposite side of the resin coating layer performs the electrode protecting function of the cover films mentioned above. As a result, the cover films can be omitted and discomfort can be reduced more significantly than in the conventional art.

Still further in accordance with the second and various exemplary embodiments, the coating layer is preferably composed of a resin having a higher fire retardant characteristic than the resin film. The arrangement allows an improvement in the fire retardancy of the mat electrode as well as the waterproof protection and electrical insulation protection of the electrodes.

DETAILED DESCRIPTION OF THE PREFERRED EMBODIMENTS

Figure 1:
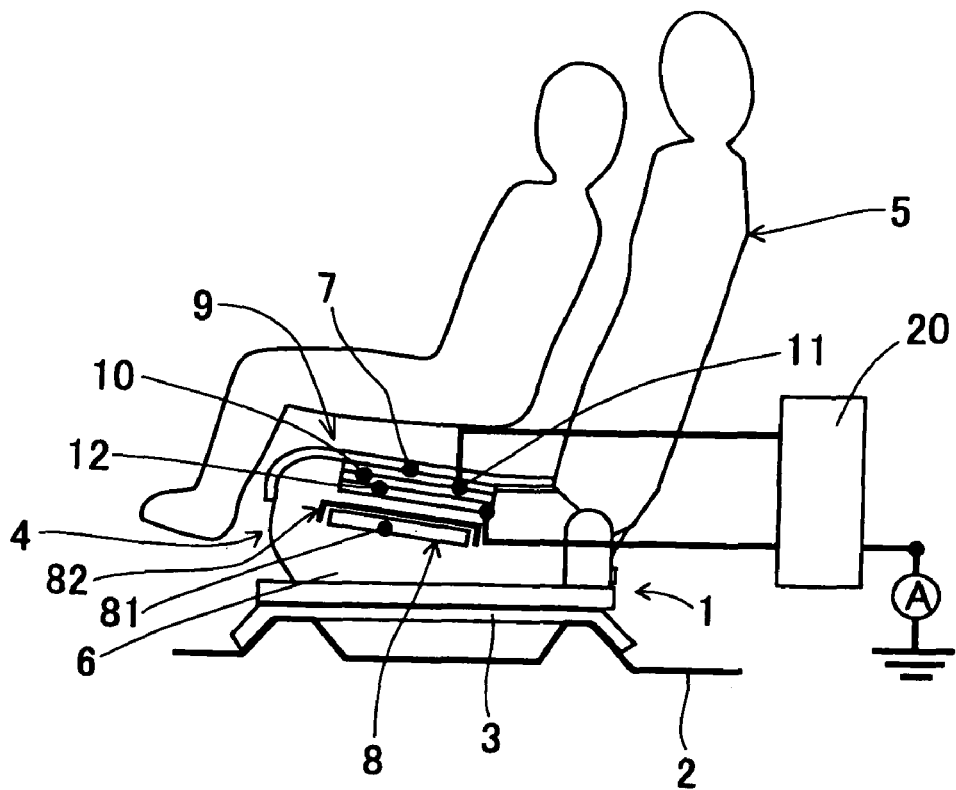
FIG. 1 is a diagram illustrating a vertical cross-section of a mat electrode in accordance with a first embodiment.

Referring now to the drawings, the embodiments of a seat occupancy sensor using a 2-electrode film-type electrostatic capacitance sensor according to the present invention will be described herein below.

First Embodiment

The first embodiment will now be described with reference- to FIG. 1 and FIG. 2. As shown in FIG. 1, a vehicle seat device 1 is placed on a floor portion 2 of a vehicle body. The vehicle seat device 1 has a metal frame 3 mounted on the floor portion 2, a seat 4 fixed onto the frame 3 to constitute the seat portion of the vehicle seat device 1, and a seat back 5 protruding obliquely upward and rearward from the rear end of the seat 4 to form a back rest.

The seat 4 has a cushion pad 6 mainly composed of an electrical insulating material having an elasticity such as rigid foamed urethane that is fixed onto the frame 3, a cushion cover, which is referred to as the surface portion 7 of the seat and which is mainly composed of a visually appealing yet electrical insulating material, such as woven fabric, to cover the upper surface of the cushion pad 6 or the seat face, a seat heater 8 placed on the cushion pad 6 to be generally parallel with the seat face, and a mat electrode 9 which is an electrode assembly interposed between the seat heater 8 and the cushion cover 7 and provided in buried and generally parallel relation with the seat face. The seat heater 8 has a heater 81 and a waterproof film 82. It should be noted that the term seat face can refer to, for example, the horizontal seat portion that a user sits upon and is not limited to a face or surface portion. For example, the seat face can extend to a certain depth since, as will be described in greater detail, sensor portions can be "buried" within the seat face.

The mat electrode 9 can include an electrical insulating resin film 10 having a predetermined relative dielectric constant, a laminar upper electrode 11 provided to extend over the upper surface of the resin film 10 in tight contact therewith, a laminar lower electrode 12 provided to extend over the lower surface of the resin film 10 in tight contact therewith, a resin coating layer 13 covering the upper electrode 11, and a resin coating layer 14 covering the lower electrode 12. Materials used for the resin film 10, the upper electrode 11, the lower electrode 12, and the resin coating layers 13 and 14 are as already described above. For example, conventional flexible circuit boards can be used extensively for the resin film 10, the upper electrode 11, and the lower electrode 12.

The mat electrode 9 and a detector circuit portion 20 constitute a 2-electrode film-type electrostatic capacitance sensor according to the present invention. Since the principle of detection and circuit structure of the 2-electrode film-type electrostatic capacitance sensor are typically as described in JP-2001-201129 A noted above, a detailed description thereof will be omitted. In a preferred example, the detector circuit portion 20 applies an alternating-current (AC) voltage between the lower electrode 12 and the vehicle body AC, and detects the resulting change in the AC potential at the upper electrode 11. Otherwise, the detector circuit portion 20 may also apply an AC voltage between the lower electrode 12 and the vehicle body or ground, supply an alternating current to the upper electrode 11 such that the AC potential at the upper electrode 11 becomes equal to the potential at the lower electrode 12, and detect a change in the alternating current, as described in JP-2001-201129 A.

Because the specific dielectric constant of a human body is about 50, changes occur in the alternating voltage and the alternating current depending on whether the seat is occupied. These changes are rectified, smoothed, and then digitized based on a predetermined threshold voltage. From the status value of the resulting digital signal, it is determined whether the seat is occupied by a vehicle passenger. In other words, if a predetermined threshold is exceeded, the determination of occupancy can be made. In a 2-electrode film-type electrostatic capacitance sensor of this type, the lower electrode 12 can substantially cut off the parasitic capacitance between the upper electrode 11 and the lower part of the vehicle body or the heater 81, which are substantially at the ground potential. As a result, the detection sensitivity increases compared with that of a 1-electrode electrostatic capacitance sensor.

According to the present embodiment, the resin coating layers 13 and 14 replace the cover films and the adhesive layers thereof used in conventional 2-electrode film-type electrostatic capacitance sensors achieving a significant reduction in the discomfort felt by a vehicle passenger when seated. In the conventional mat electrode 9, the tensile strength in the planar direction of the cover films, which are each mainly composed of a preformed resin film, is high so that the flexibility of the conventional mat electrode 9 is impaired.

Second Embodiment

The second embodiment will now be described with reference to FIG. 3. The mat electrode 9, according to the second embodiment, is obtained by replacing only the resin coating layer 13 of the mat electrode 9 according to the first embodiment shown in FIG. 2 with the adhesive layer 130 and the cover film 150. The cover film 150 has been preliminarily formed into the shape of a film by stretching or the like and cut into a predetermined size. The cover film 150 thus formed is adhered to the respective upper surfaces of the upper electrode 11 and the resin film 10 via the adhesive layer 130 covering the upper electrode 11.

Compared with the mat electrode 9 according to the first embodiment, the mat electrode 9 according to the second embodiment gives an increased sense of hardness to the seat occupant, but can improve electrical insulation and waterproofness between itself and the upper space.

Figure 2:
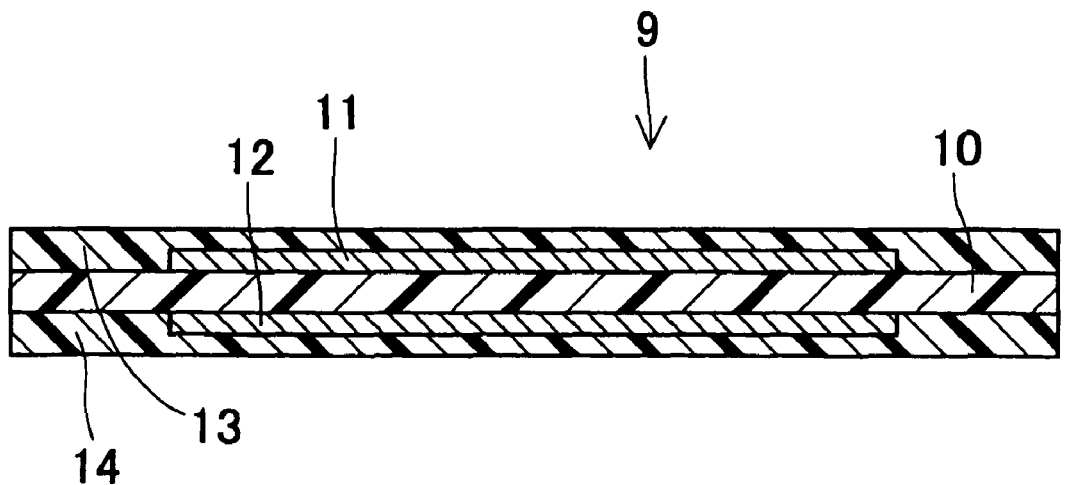
FIG. 2 is a diagram illustrating a side cross-section of the mat electrode of FIG. 1.

It will easily be understood that, in some cases, only the resin coating layer 14 of the mat electrode 9 according to the first embodiment shown in FIG. 2 may be replaced with the adhesive layer and the cover layer.

Third Embodiment

Figure 4:
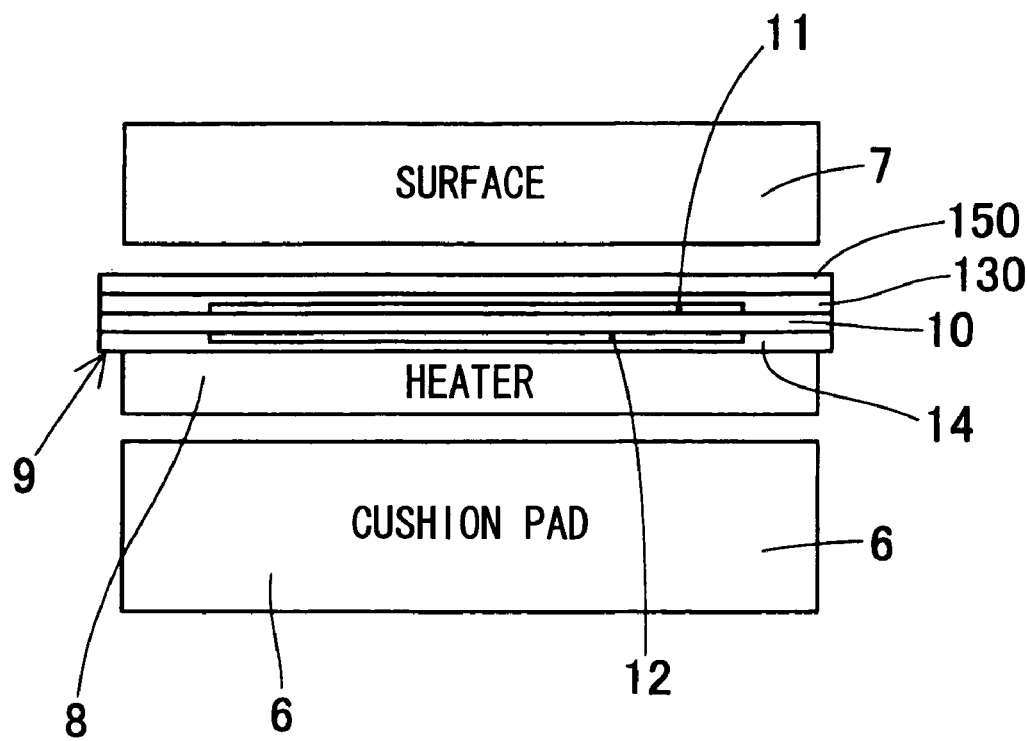
FIG. 4 is a diagram illustrating a side cross-section in accordance with a third embodiment.

The third embodiment will be described with reference to FIG. 4. FIG. 4 is a side cross-sectional diagram of the mat electrode 9. In FIG. 4, the cross section of each of the components of the mat electrode 9 is shown without hatching.

Figure 3:
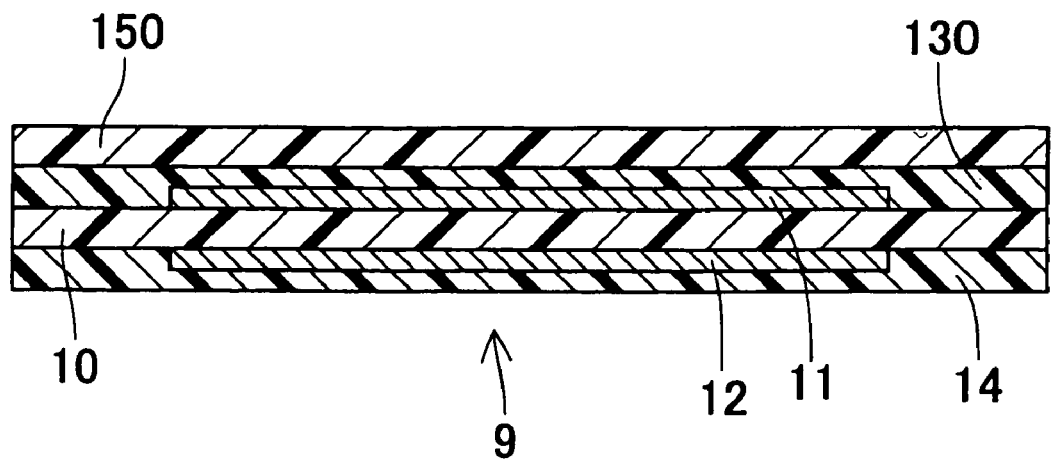
FIG. 3 is a diagram illustrating a side cross-section in accordance with a second embodiment.

The mat electrode 9 according to the third embodiment is obtained by disposing the mat electrode 9 according to the second embodiment shown in FIG. 3 in adjacent relation on the upper surface of the heater 8. As shown in FIG. 4, the resin coating layer 14 is disposed closer to the heater 8, while the cover film 150 is disposed closer to a top coat 7, which can also be referred to herein as the surface portion of the seat.

Since the cover film 150 having more excellent waterproofness than the resin coating layer 14 is disposed closer to the top coat, the degradation of waterproofness with respect to the mat electrode 9 and the heater 8 can be suppressed.

Fourth Embodiment

Figure 5:
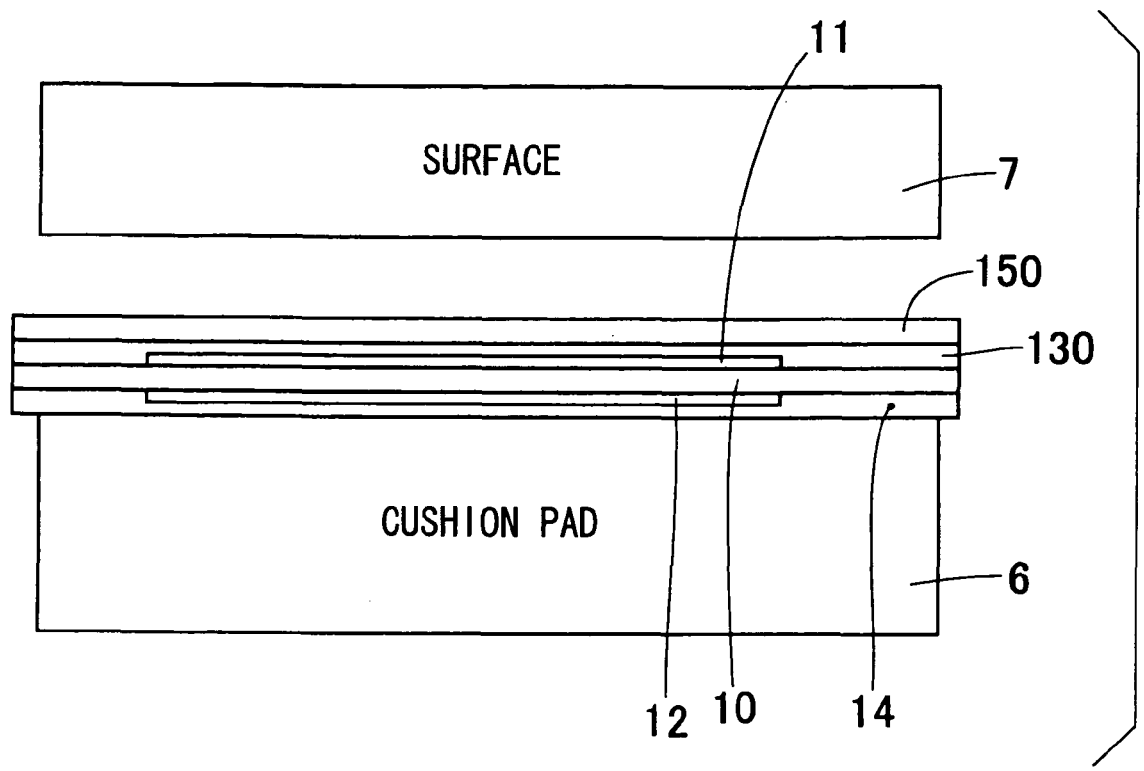
FIG. 5 is a diagram illustrating a side cross-section in accordance with a fourth embodiment.

A fourth embodiment will now be described with reference to FIG. 5. It should be noted that the cross section of each of the components of the mat electrode 9 is shown without hatching.

The mat electrode 9 according to the fourth embodiment is obtained by removing the heater 8 from the third embodiment shown in FIG. 4 and bringing the lower surface of the mat electrode 9 into direct contact with the upper surface of the cushion pad 6. As shown in FIG. 5, the resin coating layer 14 is disposed closer to the cushion pad 6, while the cover film 150 is disposed closer to the top coat 7.

Since the cover film 150 has a greater waterproof characteristic than the resin coating layer 14 and is disposed on the top-coat 7 side, the degradation of waterproofness of the mat electrode 9 can be suppressed.

Fifth Embodiment

A fifth embodiment will now be described with reference to FIG. 6. It should be noted that the cross section of each of the components of the mat electrode 9 is shown without hatching.

The mat electrode 9 according to the fifth embodiment is obtained by removing the upper electrode 11 and the upper resin coating layer 13 from the mat electrode 9 shown in FIG. 2 and then adding another resin film 10a, the upper electrode 11, and the adhesive layer 130 to the mat electrode 9 shown in FIG. 2.

Figure 6:
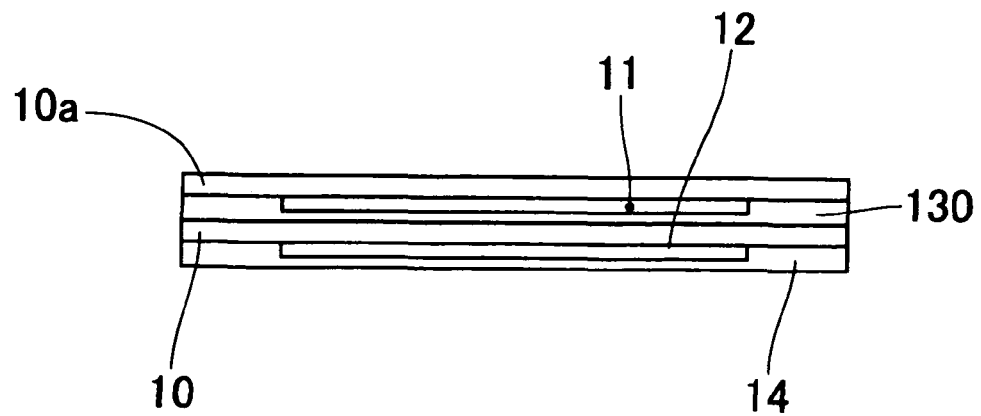
FIG. 6 is a diagram illustrating a side cross-section in accordance with a fifth embodiment.

In FIG. 6, the upper electrode 11 is formed on the lower surface of the additional resin film 10a. In other words, the present embodiment uses the two resin films with the electrodes each having an electrode layer on one side, which are stacked and bonded to each other via the adhesive layer 130. The arrangement makes it possible to avoid the use of the resin film 10 of a double-side electrode type, which requires a complicated production process including making a relatively difficult connection to a connector. In addition, the sensor according to the present embodiment can reduce a sense of hardness felt by the seat occupant, compared with the conventional sensor.

In a variation of the fifth embodiment, it will be easily understood that the adhesive layer 130 may also be a self-adhesive layer The thickness of each of the components of the mat electrode 9 is determined by durability and a required tensile strength. Preferably, the thickness of the resin film 10 is adjusted to about 1 mm.

To alleviate hard surface characteristic, it is preferable to form the mat electrode 9 into the shape of a meandering belt which meanders in one direction, while extending in a direction orthogonal to the meandering direction. Various shapes including a double meandering shape and other shapes can be adopted.

Sixth Embodiment

Figure 7:
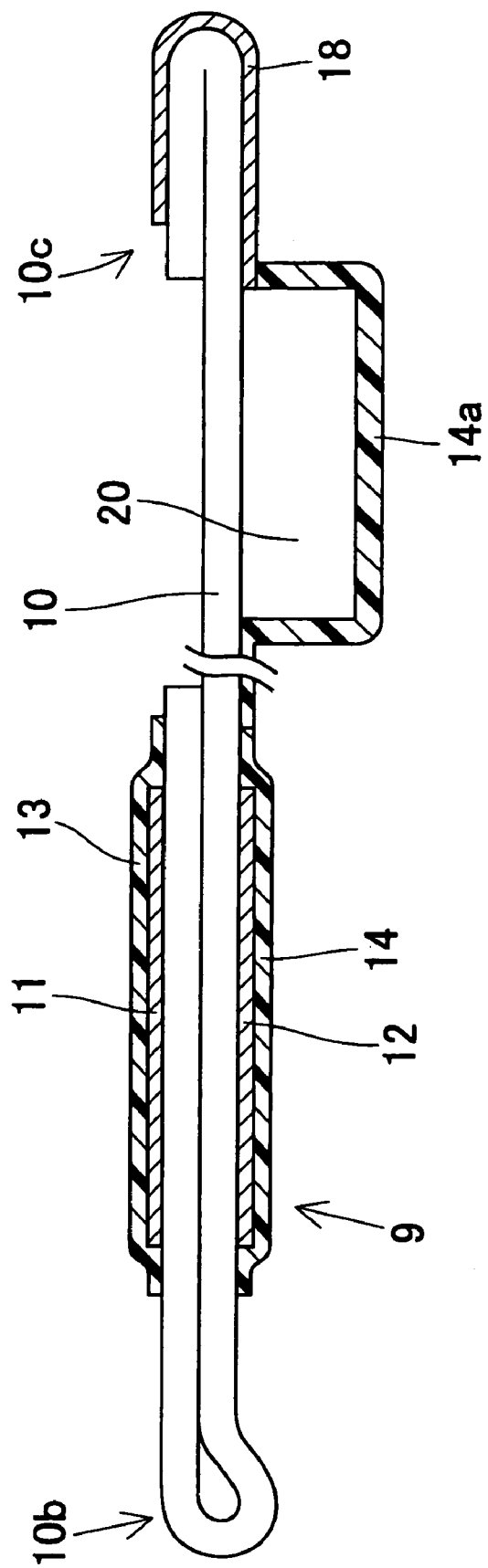
FIG. 7 is a diagram illustrating a side cross-section in accordance with a sixth embodiment.
Figure 8:
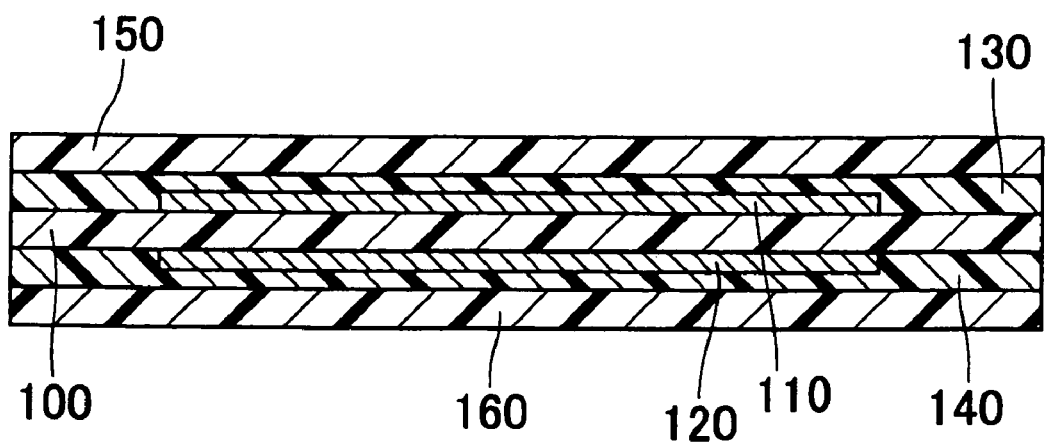
FIG. 8 is a diagram illustrating a side cross-section of the mat electrode of a conventional 2-electrode film-type electrostatic capacitance sensor.

A sixth embodiment will now be described with reference to FIG. 7. It should be noted that the cross sections of some of the components of the mat electrode 9 are shown without hatching.

The mat electrode 9 according to the sixth embodiment is formed by disposing the upper electrode 11, the lower electrode 12, and terminal electrodes 18 at different positions on one side of the resin film 10. On the side of the resin film on which the upper electrode 11, the lower electrode 12, and the terminal electrodes 18 are disposed, an IC composing the detector circuit portion 20 is mounted and the resin coating layers 13 and 14 are provided to cover and protect the electrodes 11 and 12 as well as 14a to cover and protect the detector circuit portion 20. The resin film 10 is folded back at the generally middle portion 10b in the extending direction thereof to bring the upper electrode 11 and the lower electrode 12 into overlapping relation. The resin film 10 also has one end 10c folded back to compose a terminal portion having the terminal electrodes 18. The terminal electrodes 18 extend from the individual terminals (not shown) of the detector circuit portion 20, and the upper electrode 11 and the lower electrode 12 also extend from a pair of the terminals (not shown) of the detector circuit portion 20. Preferably, the detector circuit portion 20 can include a resin molded IC in the form of a chip and soldered to a conductive pattern on the resin film 10 with solder bumps. In FIG. 7, the plurality of terminal electrodes 18 are spaced apart at predetermined intervals in the thickness direction of the drawing sheet with FIG. 7 and each press-fit in a female connector, not shown, to achieve electrical connection. Accordingly, the sensor according to the present embodiment alleviates a sense of hardness to the seat occupant and implements a simplified production process, compared with the conventional sensor.

It should be noted that in each of the above described embodiments, a resin having excellent fire retardancy is preferably used as the resin material of the resin coating layers. Examples of the resin having excellent fire retardancy and used preferably for the resin coating layer include a polyurethane-based resin resist or a polyester-based resin resist.

What is claimed is:

1. A film-type electrostatic capacitance sensor for detecting occupancy of a seat mounted in a vehicle, the sensor comprising:
    a planar mat buried in one of a seat face portion and a back rest portion of the seat, the planar mat extending along the one of the seat face portion and the back rest portion of the seat, the planar mat having a resin film extending along the one of the seat face portion and the back rest portion of the seat, and at least two electrodes provided individually on different sides of the resin film, the planar mat including an electrically insulating electrode protecting portion covering at least an exposed portion of each of the at least two electrodes; and
    a detector circuit portion detecting a change in an electrical state of the planar mat between the at least two electrodes based on whether the seat is occupied, wherein:
    the two electrodes are provided individually on both sides of the resin film;
    the electrode protecting portion provided on one of the sides of the resin film includes a resin coating layer;
    the electrode protecting portion provided on the other of the sides of the resin film includes a preformed resin film as a cover film;
    the planar mat is interposed between a cushion pad of the seat and a surface portion of the seat;
    the resin coating layer is disposed closer to the cushion pad;
    the planar mat is interposed between a heater portion of the seat and a surface portion of the seat;
    the resin coating layer is disposed closer to the heater portion; and
    the resin coating layer is formed on the same surface of the resin film as the detector circuit portion mounted on the resin film.

2. The film-type electrostatic capacitance sensor according to claim 1, wherein the coating layer includes a resin having a higher fire retardant characteristic than the resin film.

3. A film-type electrostatic capacitance sensor capable of detecting seat occupancy by an occupant of a seat mounted in a vehicle, the sensor reducing a discomfort of the occupant, the sensor comprising:
    a planar mat buried in a portion of the seat capable of being in contact with the occupant, the planar mat extending along a plane associated with the portion, the planar mat including a resin film and two electrodes provided on different sides of the resin film, and an electrically insulating electrode protecting portion covering at least an exposed portion of each of the two electrodes; and
    a detector circuit portion for detecting an electrical change between the two electrodes based on whether the seat is occupied, wherein
    the electrode protecting portion provided on at least one of the sides of the resin film includes a flexible resin coating layer having a flexibility so as to reduce the discomfort of the occupant;
    the electrode protecting portion provided on the other of the sides of the resin film includes a preformed resin film as a cover film so as to improve electrical insulation and waterproofness;
    the planar mat is interposed between a cushion pad of the seat and a surface portion of the seat;
    the flexible resin coating layer is disposed closer to the cushion pad than the resin film and the two electrodes;
    the planar mat is interposed between a heater portion of the seat and a surface portion of the seat;
    the flexible resin coating layer is disposed closer to the heater portion; and
    the flexible resin coating layer is formed on the same surface of the resin film as the detector circuit portion mounted on the resin film.

4. The film-type electrostatic capacitance sensor according to claim 3, wherein the flexible resin coating layer includes a resin having a fire retardant characteristic that is higher than the resin film.

* * * * *